(12) United States Patent
Kamada et al.

(10) Patent No.: US 7,052,075 B2
(45) Date of Patent: May 30, 2006

(54) VEHICULAR BODY PANEL OR COMPONENT PART AND METHOD FOR MANUFACTURING SAME

(75) Inventors: Teruo Kamada, Sayama (JP); Takashi Tsuchiya, Sayama (JP); Noriaki Iwanami, Sayama (JP); Masamitsu Numano, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 10/909,630

(22) Filed: Aug. 2, 2004

(65) Prior Publication Data

US 2005/0023059 A1 Feb. 3, 2005

Related U.S. Application Data

(63) Continuation-in-part of application No. 09/901,000, filed on Jul. 9, 2001, now abandoned.

(30) Foreign Application Priority Data

Jul. 10, 2000 (JP) .............................. 2000-208884
Aug. 11, 2000 (JP) .............................. 2000-244731

(51) Int. Cl.
*B62D 25/10* (2006.01)
(52) U.S. Cl. .............................. 296/187.01; 180/69.21; 296/193.11
(58) Field of Classification Search ........... 296/193.11, 296/187.01; 180/69.21
See application file for complete search history.

(56) References Cited

U.S. PATENT DOCUMENTS

| 403,709 | A | 5/1889 | Upson |
|---|---|---|---|
| 730,423 | A | 6/1903 | Wells |
| 2,479,741 | A | 8/1949 | Grimland |
| 3,842,485 | A | 10/1974 | Bement |
| 4,097,958 | A | 7/1978 | Van Dell |
| 4,186,476 | A | 2/1980 | Mair et al. |
| 4,206,865 | A | 6/1980 | Miller |
| 5,115,878 | A | 5/1992 | Hayata |
| 5,682,667 | A | 11/1997 | Flagg |
| 5,988,305 | A | 11/1999 | Sakai et al. |
| 6,371,231 | B1 | 4/2002 | Nushii et al. |
| 6,481,259 | B1 * | 11/2002 | Durney ....................... 72/324 |
| 2003/0037586 | A1 | 2/2003 | Durney et al. |

FOREIGN PATENT DOCUMENTS

| DE | 40 19 121 A1 | 1/1991 |
|---|---|---|
| DE | 195 25 289 A1 | 3/1996 |
| DE | 195 24 235 A1 | 1/1997 |
| DE | 197 18 786 A1 | 11/1997 |
| EP | 0 486 093 B1 | 5/1995 |
| GB | 2197810 | 6/1988 |
| JP | 58-128231 A | 7/1983 |
| JP | 58211974 | 12/1983 |

(Continued)

*Primary Examiner*—Dennis H. Pedder
(74) *Attorney, Agent, or Firm*—Rankin, Hill, Porter & Clark LLP

(57) ABSTRACT

A vehicular body panel or component part having a reinforcing backing plate reconciled to a part of a blank material at a position wherein a bending formation is implemented. The backing plate has one or more apertures formed in at least one lateral raw at a location equivalent to the position of the bending formation. When forming the blank material and the backing plate concurrently by a bending operation, the backing plate becomes intimately associated with the blank sheet to avoid the backing plate from locally separating from the blank material and from forming a gap relative thereto, with a resultant improved product quality.

32 Claims, 16 Drawing Sheets

FOREIGN PATENT DOCUMENTS

| | | |
|---|---|---|
| JP | 596174 | 1/1984 |
| JP | 59-202119 | 11/1984 |
| JP | 361180 | 3/1991 |
| JP | 361181 | 3/1991 |
| JP | 3-161128 | 7/1991 |
| JP | 10-129527 A | 5/1998 |

\* cited by examiner

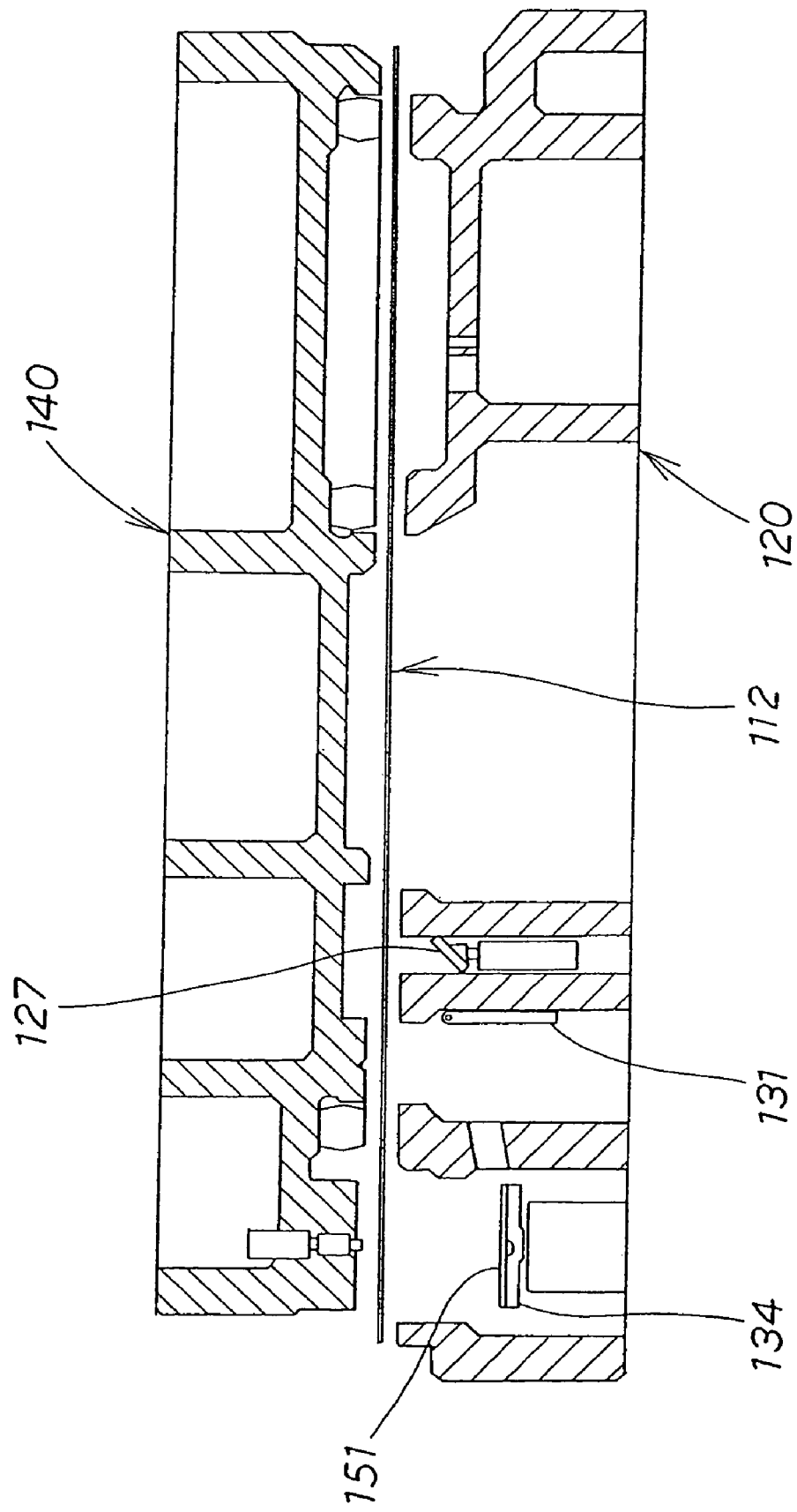

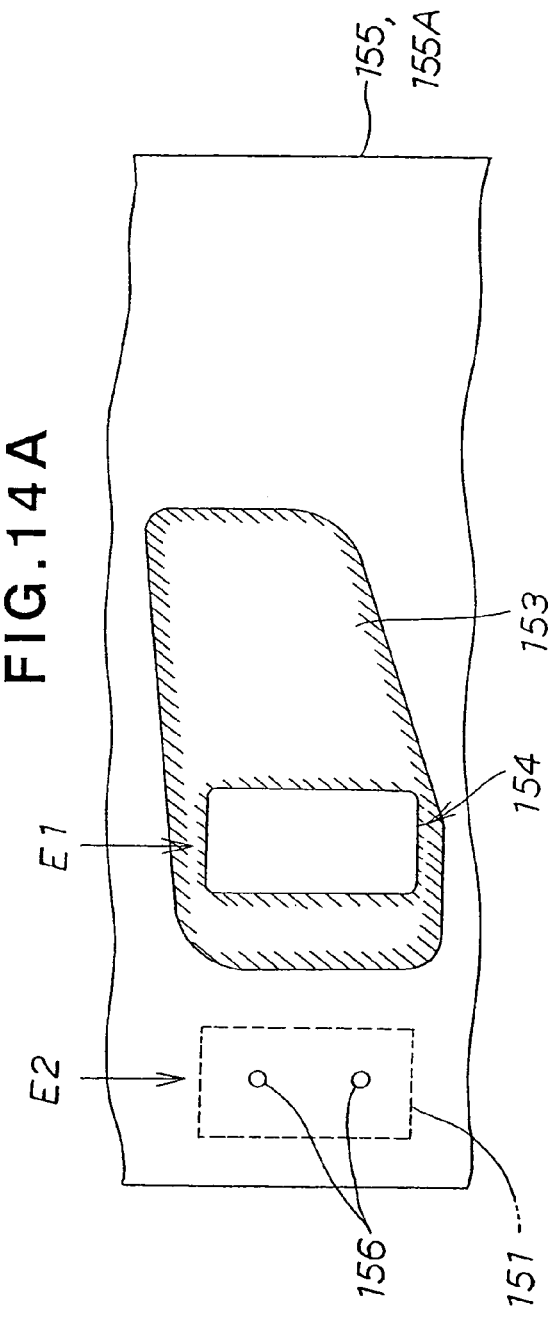
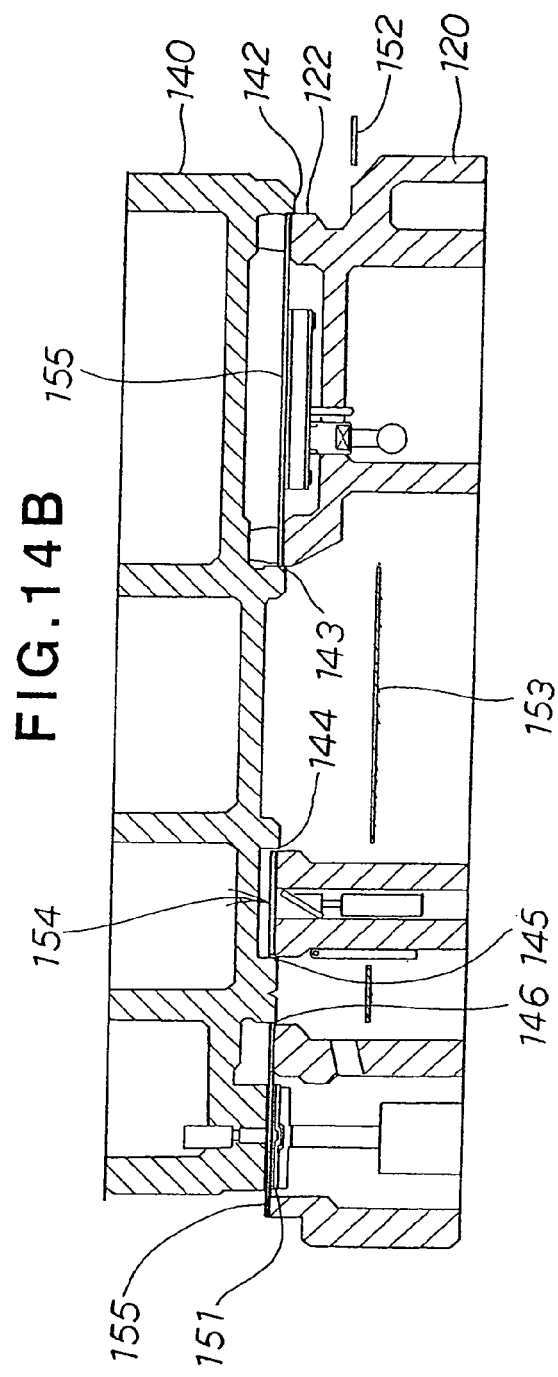

FIG.15A
FIG.15B
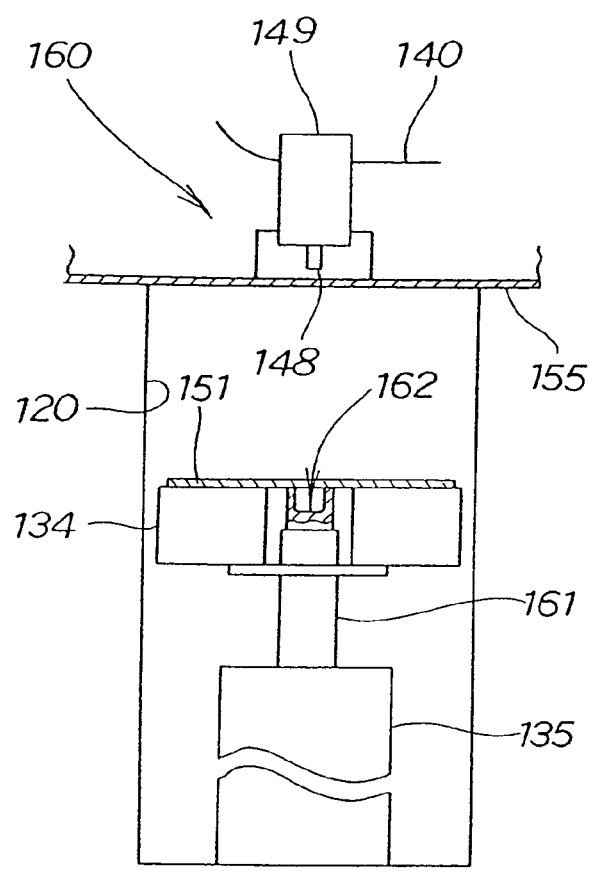
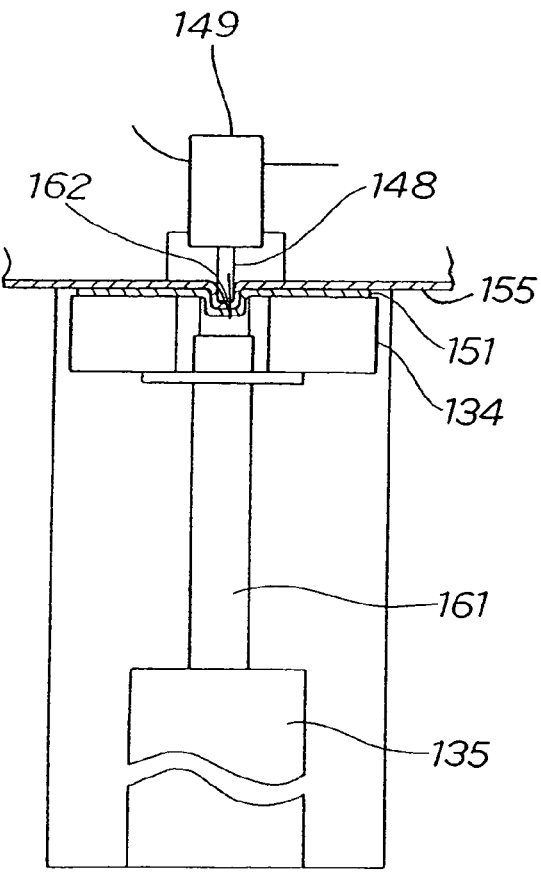

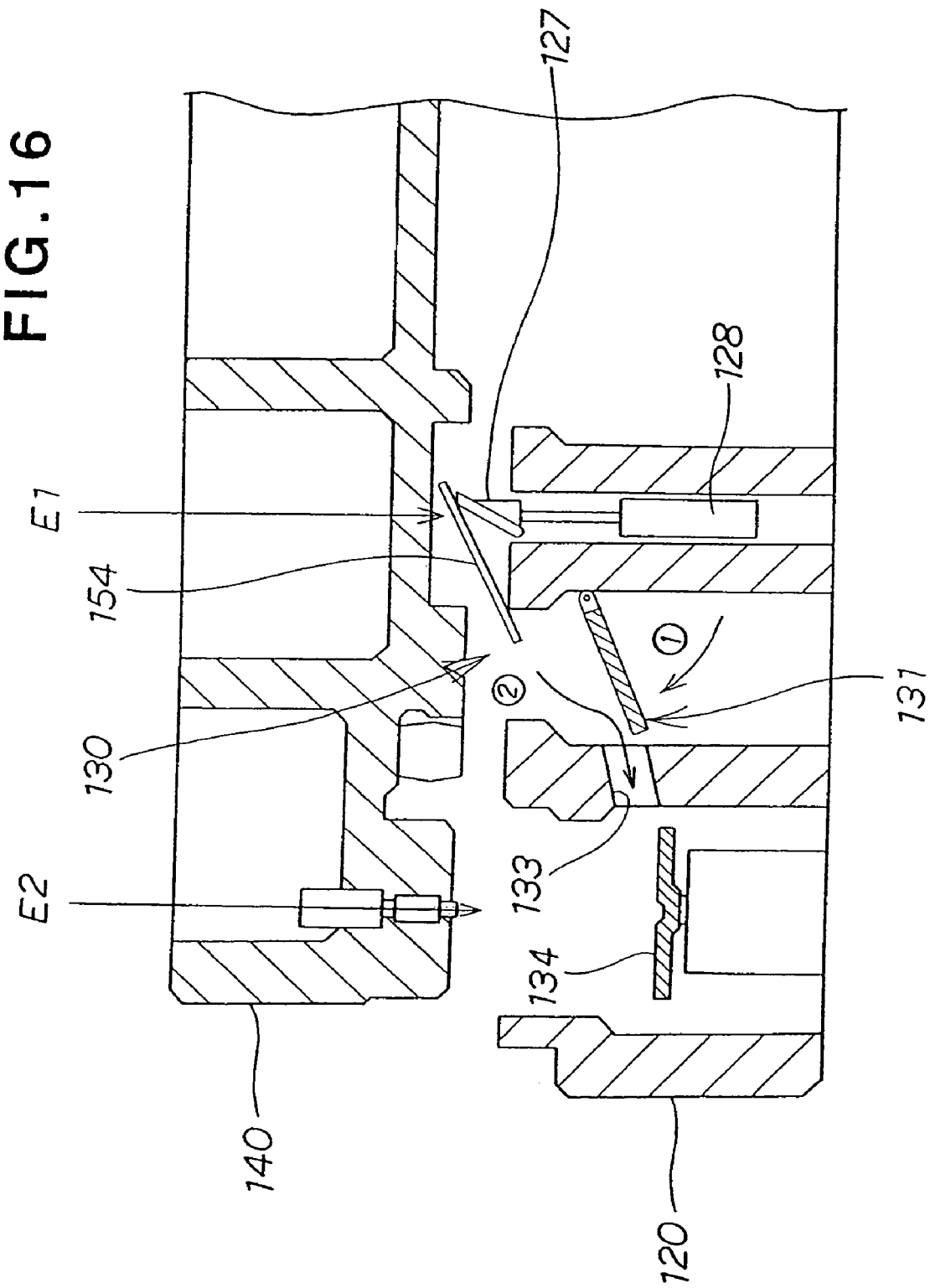

VEHICULAR BODY PANEL OR COMPONENT PART AND METHOD FOR MANUFACTURING SAME

BACKGROUND OF THE INVENTION

1. Field of the Invention:

This invention relates to an improvement in a technique for manufacturing a vehicular body panel or component part.

2. Description of the Related Art:

Japanese Patent Laid-Open Publication No. HEI-10-129527, for example, discloses a hood made of plastic resin material for use in an automobile. The hood has a closed cross sectional structure which is made of a product formed by a blow technique and which has an outer skin and a stiffener integral therewith. The outer skin has a main body section having a central portion extending in a widthwise direction of a vehicle body, two side edge portions located at both sides of the central position and extending in a longitudinal direction of the vehicle body, and two connecting portions interconnecting the central portion and the respective side edge portions. Each connecting portion includes a reinforcement rib extending from the stiffener and deposited onto the outer skin. The reinforcement rib imparts increased rigidity to the hood.

The presence of the hood made of the panel formed by plastic resin material provides no difficulty in implementing the aforementioned deposition during the forming operation of the plastic resin or in heat fusion of the two members (i.e., the reinforcement rib and the outer skin). However, the hood made of a steel panel obtained by bending formation of the blank material is remarkably in wide use rather than the plastic panel. The hood made of the steel sheet encounters another issue different from the plastic panel. In particular, although it has been a usual practice to employ a structure wherein a reinforcement plate, which is called as a backing plate, is attached to the steel panel with a view to mounting a hinge or striker to the hood panel, the presence of the backing plate formed of a curved plate encounters a problem during mounting the backing plate to the hood. This problem is more clearly described with reference to FIGS. 19A and 19B hereof.

As shown in FIG. 19A, a hood frame 201, formed by bending the steel blank material, and a steel backing plate 202, formed by bending the steel sheet to conform to the curved profile of the hood frame 201, are prepared and are brought into contact with one another as shown by arrow ①.

As shown in FIG. 19B, an edge of the backing plate 202 is connected to the hood frame 201 by a weld bead 203. Such a technique for connecting the backing plate is widely used in known practice. In such a mounting technique, it is required to separately form the hood frame 201 and the backing plate 202 separately by bending with a bending press or with a bending machine, respectively, requiring two separate bending steps.

In many cases wherein the backing plate 202 has a larger thickness than that of the hood frame 201, there are some cases wherein the backing plate 202 has a smaller thickness than that of the hood frame 201. In general, the thickness of the hood frame 201 is not necessarily equal to that of the backing plate 202. Since the steel plates suffer from spring back phenomenon (i.e., a slight amount of restoring of the press material after press forming step) different in magnitude from one another depending on the thickness and the bending radius, there exists a slight difference in the curved shape between the hood frame 201 and the backing plate 202. When reconciling or joining these components with such a difference in the curved shape, there exists an increased tendency wherein a gap is produced at corners 204,205. Although the backing plate 202 functions to locally reinforce the thin hood frame 201, the presence of the gap results in a decrease in the reinforcement effect.

In such a conventional manufacturing method described with reference to FIGS. 19A and 19B, the bending operation should be implemented in two steps, with a resultant increase in the fabrication cost and a resultant decrease in the reinforcement effect owing to the gap created between the hood frame and the backing plate.

Next, when an outer side panel of raw material is blanked out from a single stripped-shaped steel plate, a tail gate of the raw material is also concurrently blanked out with a view to improving the production yield with the use of a blanking method for a vehicle body, which is disclosed, for example, in Japanese Patent Laid-Open Publication No. SHO-58-128231. In this method, when the outer side panel of the raw material is sequentially blanked out from the steel plate, it is a usual practice to blank out left and right symmetrical divided raw material for lower halves of the tail gate raw material from the steel plate at a portion thereof corresponding to a blanking area to form a door mount section while blanking out left and right asymmetrical divided raw material for upper halves of the tail gate raw material from the steel plate between the outer side panels of the raw material remaining side by side. The two upper divided halves and the two lower divided halves are welded to one another to obtain the tail gate of the raw material. Thus, it is well known to cut out a piece from a scrap portion, which is produced during the blanking step of the vehicular body of the raw material, for utilizing the piece to manufacture component parts of the vehicle body for thereby improving the yield of the raw material.

In the above method, the outer side panel of the raw material, which is discharged from the blanking press, is then sequentially transferred through a drawing press, a trimming press and a piercing press to implement the contracting step, the edge cutting step and the aperture forming step, respectively, to complete the formation of the outer side panel. On the other hand, the two divided lower halves of the raw material and the two divided upper halves, both of which are discharged from the blanking press, are transferred to a welding site in another route, wherein these components are welded together to form the tail gate of the raw material.

Paying attention to the two divided lower halves and the two divided upper halves, it is required for a specific transfer means, which transfers these components, to be located so as to extend from the blanking press, with a resultant factor which reduces a work space around the blanking press.

Further, it is necessary for these components to be adequately managed to prevent the components from getting mixed with other components or from being lost.

In addition, it is necessary to prepare a temporary stock space in the welding site for the two divided lower halves of the raw material and the two divided upper halves, and another temporary stock space in the welding site for the completed tail gates of the raw material, occupying a relatively larger space for the welding site.

When trying to improve the yield of the raw material by cutting out a useful piece from the scrap portion in the aforementioned manner, it becomes necessary for a specific transfer means for the piece, a loss protective measure for the piece and the welding site in a large space to be provided, with a resultant increased cost in the equipment as well as an increase in an area for which the equipment is installed.

SUMMARY OF THE INVENTION

It is therefore a first object of the present invention to provide a vehicular body panel or component part and a method of manufacturing the same, which are capable of implementing a forming step in a single step without forming a gap between a hood frame and a backing plate.

According to a first aspect of the present invention, there is provided a vehicular body panel or vehicular component part which comprises a blank material having a formed portion, and a backing plate reconciled with the blank material and having at least one aperture located in a position corresponding to the formed portion to accommodate physical characteristics or properties of the blank material.

The presence of the aperture formed in the backing plate at the position corresponding to the formed portion of the blank material permits the backing plate to preferably become integral or unitary with the blank material. That is, when forming the two components by bending operation, there is no fear in the backing plate from locally separating from the blank material to form the gap, with a resultant increase in a finishing quality of the vehicular body panel or the vehicular component part.

The vehicular body panel involves, for example, panels such as an inner skin which forms a hood listed in the illustrated embodiment and, in addition to this component part, a door, a floor and a roof which form part of a vehicle body. In the event that the backing plate is used in the inner skin, two backing plates are reconciled to both side edge portions of the blank material in a widthwise direction of the vehicle body, respectively.

According to a second aspect of the present invention, there is provided a method of manufacturing a vehicular body panel or a vehicular component part, which comprises the steps of preparing a blank material for the vehicular body panel or a blank material for the vehicular component part, preparing a backing plate formed with at least one aperture to cope with a characteristic of the blank material, reconciling the backing plate to the blank material, and forming the blank material together with the backing plate.

The term "formation" used herein means a plastic deformation processing such as bending, contracting and expanding. Below discussions will be made using "bending", as an example. The employment of the backing plate formed with the aperture renders the blank material to be subjected to bending operation after the backing plate is reconciled thereto. Concurrent bending operation of the blank material and the backing plate enables the bending operation in a single step. In this event, it is possible to reduce the cost for bending operation by half as compared to the individual bending operations of the backing plate and the blank material.

According to a third aspect of the present invention, there is provided a method of manufacturing a blank material for a vehicular body panel, which comprises the steps of preparing a first backing plate for reinforcing the vehicular body panel while feeding a strip-shaped sheet for the vehicular body panel between upper and lower blanking die halves, blanking the strip-shaped sheet by mating the upper blanking die half with the lower blanking die half relative to one another for obtaining a blank material for the vehicular body panel while obtaining a second backing plate, which has the same profile as the first backing plate, from a scrap portion, mounting the backing plate by locating and reconciling the first backing plate onto the blank material remaining between the upper and lower blanking die halves, and separating the upper blanking die half from the lower blanking die half for discharging the blank material with the backing plate.

The first backing plate is reconciled to the blank material in the blanking step. When it is required to reconcile the backing plate to the blank material in another site or in another step, although it is necessary to perform the transfer of the blank material or to prepare a stock place, the present invention makes it possible to render the blank material to be manufactured in the upper and lower blanking die halves such that the transfer of the blank material or the stock place are dispensed with for thereby providing a compactness in the equipment.

The second backing plate is transferred to a position wherein the first backing plate is preliminarily located, and is then reconciled to a subsequent blank material. The backing plate is transferred within the upper and lower blanking die halves. That is, the backing plate, which is cutout with the upper and lower blanking die halves, is reconciled to the subsequent blank material without discharging the backing plate outside. If the backing plate is discharged from the blanking site and is then transferred to the welding site, a specific transfer means is required. However, the transfer of the backing plate in the die halves allows the specific transfer means to be dispensed with. In addition, since the backing plate is not discharged out from the die halves, there is no fear of loss of the backing plate for thereby omitting a component-part management work for the backing plate.

In a preferred form, the backing plate reconciling means includes a caulking mechanism having a cavity segment remaining on one side and a punch remaining on the other side such that two sheets, which are composed of the blank material and the backing plate placed thereon, are located between the cavity segment and the punch to allow the punch to thrust toward the cavity segment for thereby caulking the two sheets. Accordingly, the caulking with the punch and the cavity segment allows the working efficiency to be improved.

BRIEF DESCRIPTION OF THE DRAWINGS

Certain preferred embodiments of the invention will be described in detail below, by way of example only, with reference to the accompanying drawings, in which:

FIG. 13 is a cross sectional view illustrating a relationship between upper and lower blanking die halves and a strip-shaped plate;

FIG. 14A is a top plan view of the blank material;

FIG. 14B is a view illustrating an operation of the die halves wherein a scrap is cut out by the upper and lower die halves;

FIGS. 15A and 15B are views illustrating an operation of the backing plate reconciling means;

FIG. 16 is a view illustrating an operation of a backing plate transfer means;

DETAILED DESCRIPTION OF THE PREFERRED EMBODIMENTS

The following description is merely exemplary in nature and is in no way intended to limit the invention, its application or uses.

Figure 1:
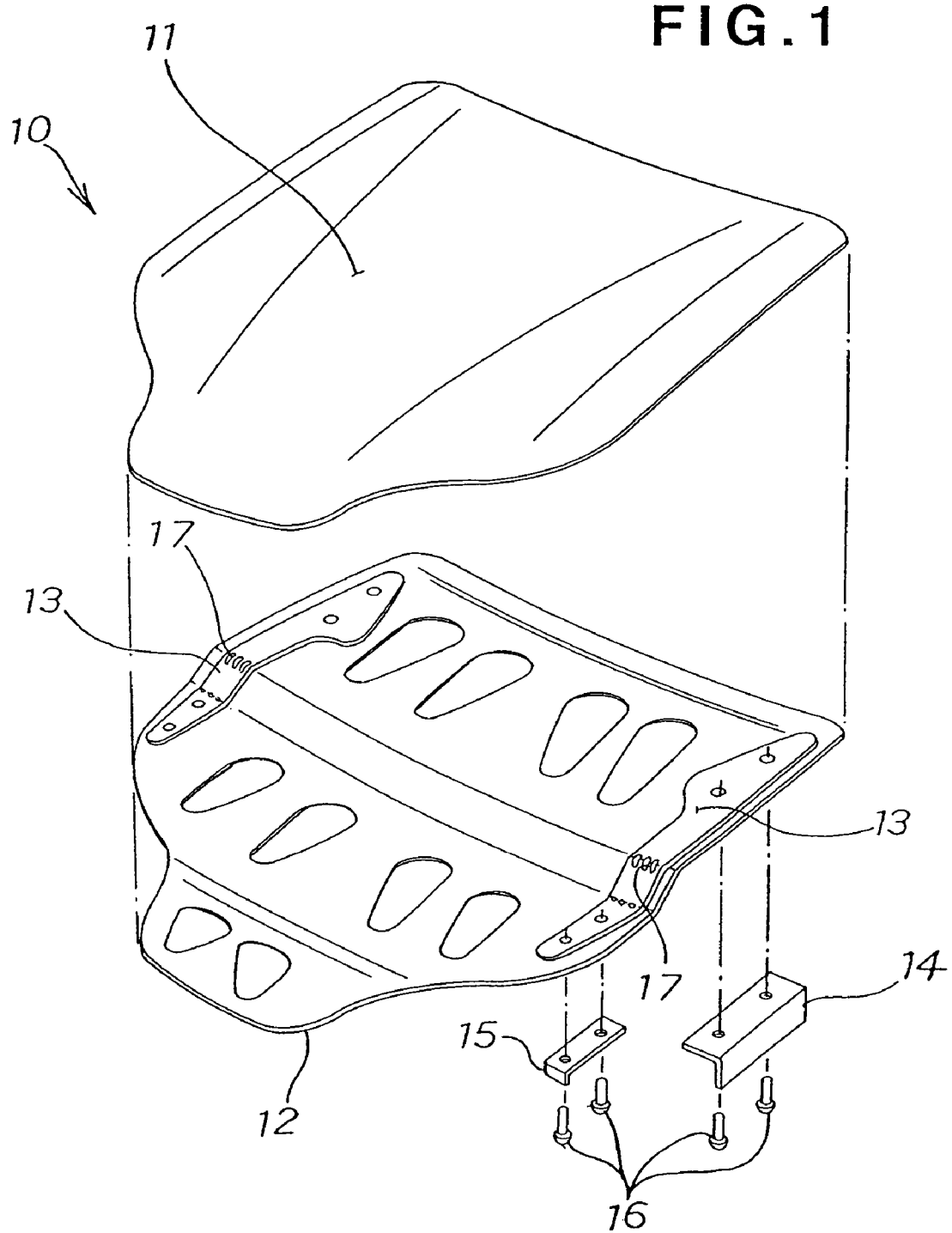
FIG. 1 is an exploded perspective view of a hood according to a preferred embodiment of the present invention.

Referring now to FIG. 1, there is shown a hood 10 which is composed of a double-layered structure wherein an outer skin 11 is piled on an inner skin 12. Both side edge portions of an upper surface of the inner skin 12 have backing plates 13, 13, respectively. Brackets 14, 15 are fixedly secured to each of the backing plates 13, 13 by means of a plurality of bolts 16, respectively. The backing plates 13, 13 function to prevent the inner skin 12, which has a thin thickness, from being applied with a localized load which causes the inner skin 12 to be locally deformed, thereby reinforcing the inner skin 12 around its side edge portions. The inner skin 12, which is attached with the backing plates 13, 13, forms a first preferred embodiment of a vehicular body panel according to the present invention.

Now, a fabrication method of the inner skin 12 as the vehicular body panel is described below with reference to FIGS. 2A to 3B.

Figure 2A:
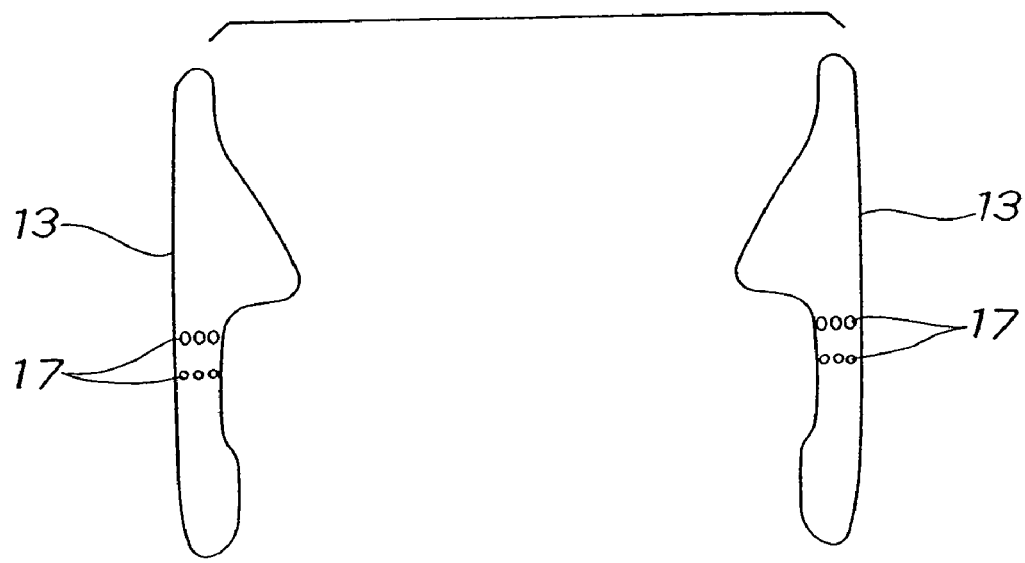
FIGS. 2A and 2B are schematic views illustrating a pair of backing plates formed with plural apertures and a blank material, to be prepared in a method of the present invention.

As shown in FIG. 2A, a pair of plate-like backing plates 13, 13, each of which has a plurality of apertures 17, are prepared.

Figure 2B:
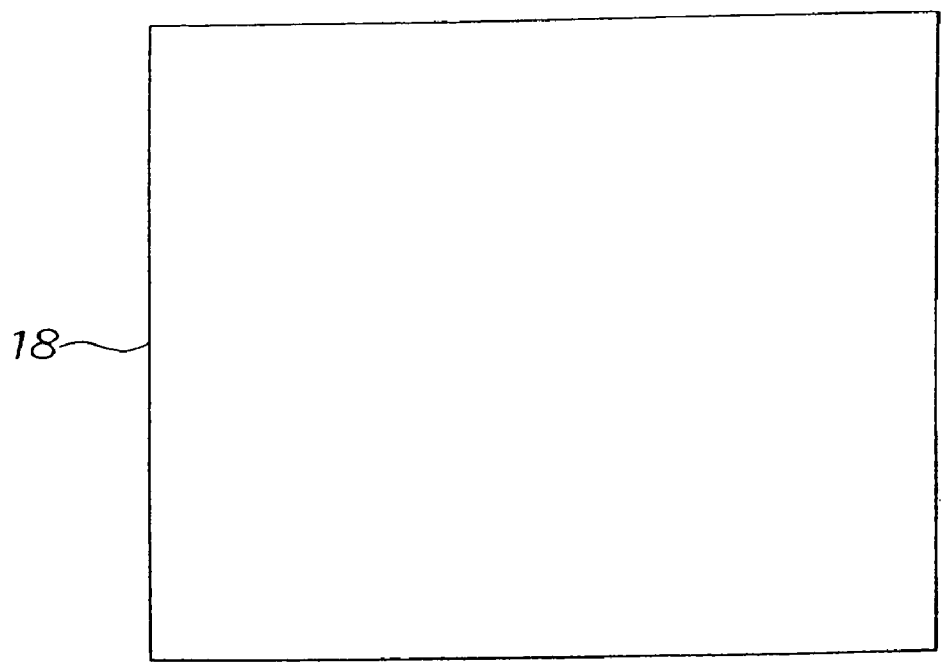

Next, as shown in FIG. 2B, a plate-shaped blank material 18 is prepared.

Naturally, the backing plates 13, 13 and the blank sheet 18 may be concurrently prepared or they may be prepared at different times. It is only important that these components be prepared in time for a joining or reconciling step described below.

Figure 3A:
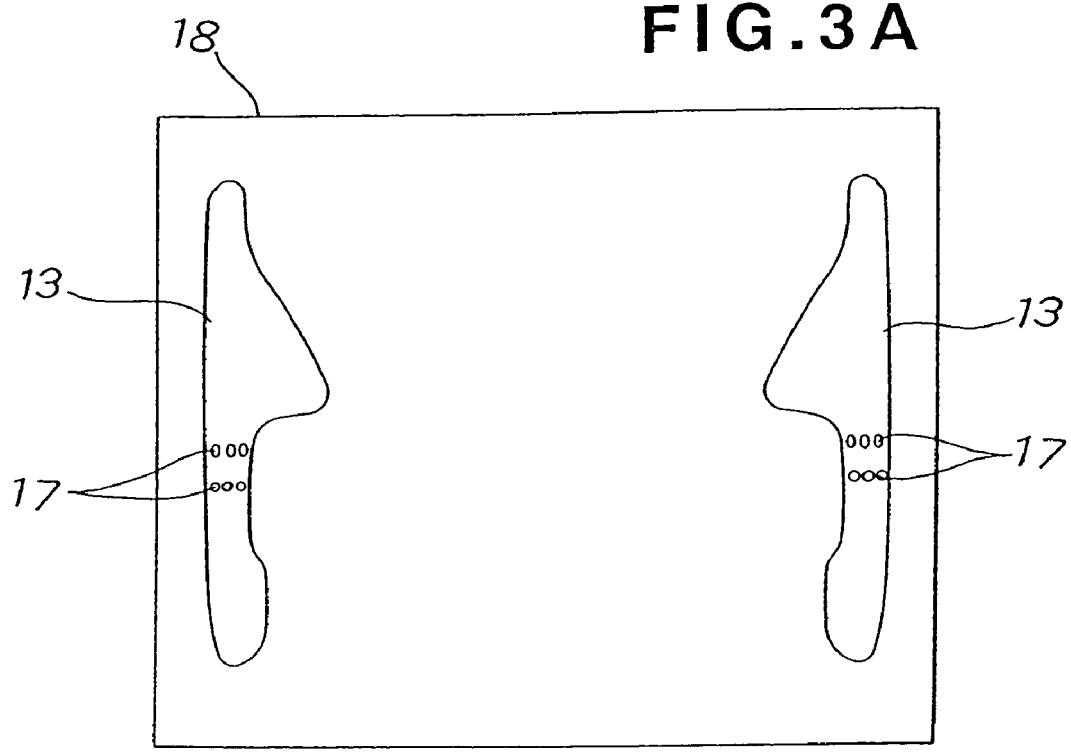
FIGS. 3A and 3B are schematic views illustrating the blank material with the backing plates joined therewith at given positions, and the blank material bent at predefined positions.
Figure 3B:
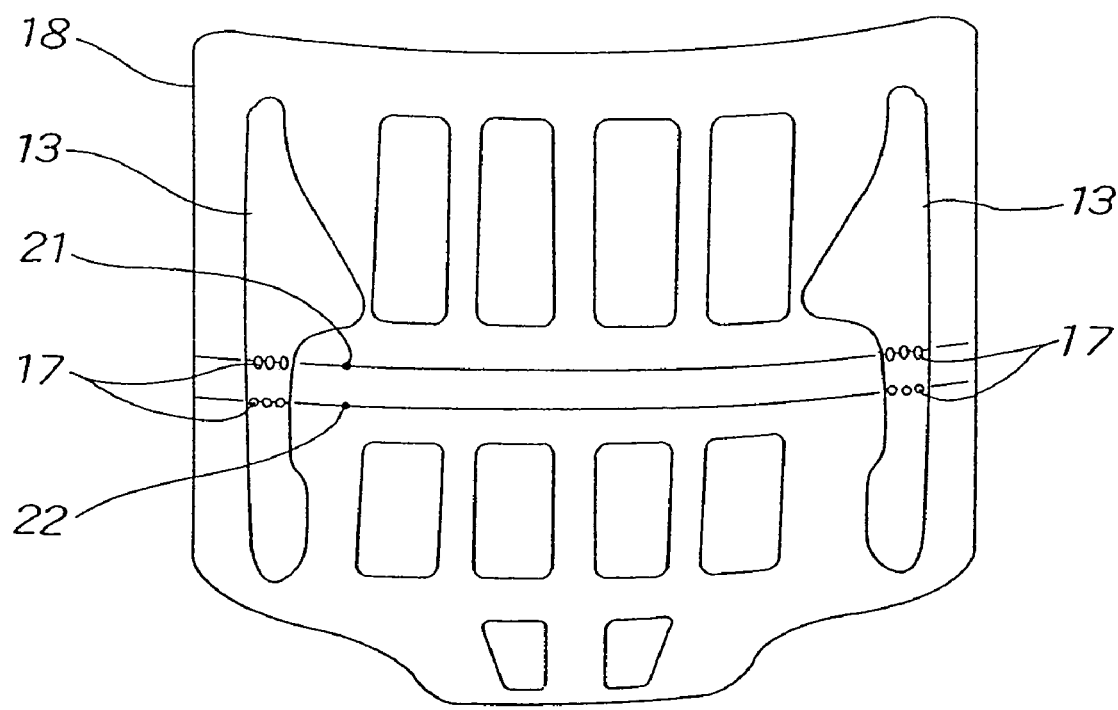

FIGS. 3A and 3B are views for illustrating a sequence of the reconciling step and a bending step.

In FIG. 3A, the backing plates 13, 13 are reconciled to the blank sheet 18 at respective predefined areas by means of an adhesive or welding, etc.

In FIG. 3B, the blank sheet 18 and the backing plates 13, 13 are bent along a convex bending line 21 and a concave bending line 22, both of which pass through the respective plural aperture rows 17, 17, respectively, thereby obtaining the inner skin 12 shown in FIG. 1. A bent portion of the blank sheet 18 is solid and free from aperture.

Now, the structure of the operation of the backing plate forming part of the present invention is described below in detail.

Figure 4:
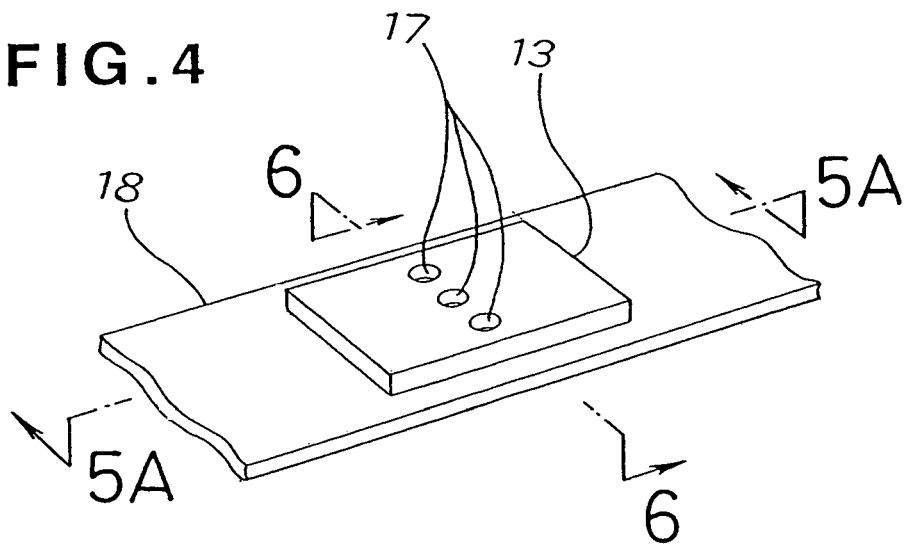
FIG. 4 is a perspective view illustrating the backing plate joined with the blank material.

FIG. 4 shows a state wherein the backing plate 13 is reconciled to the blank sheet 18. For ease of explanation, the backing plate 13 is shown as having three apertures laterally formed in a row.

Figure 5A:
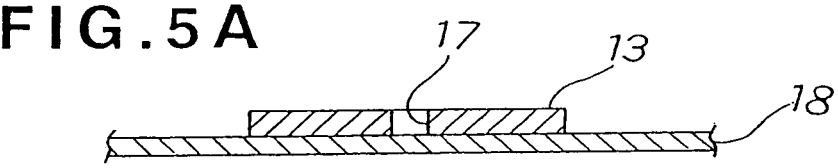
FIG. 5A is a cross sectional view taken along line 5A—5A of FIG. 4.
Figure 5B:
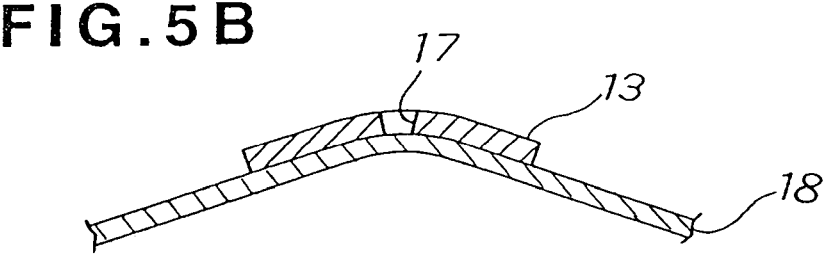
FIG. 5B is a cross sectional view illustrating a state in which the backing plate and the blank material are bent.

The flat blank sheet 18 with the backing plate 13, both of which are shown in FIG. 5A, are bent together as shown in FIG. 5B. This causes each aperture 17 to be deformed in a V-shaped profile. Subsequently, action of the backing plate 13 with the plural apertures 17 and the blank sheet 18 is described below.

Figure 6:
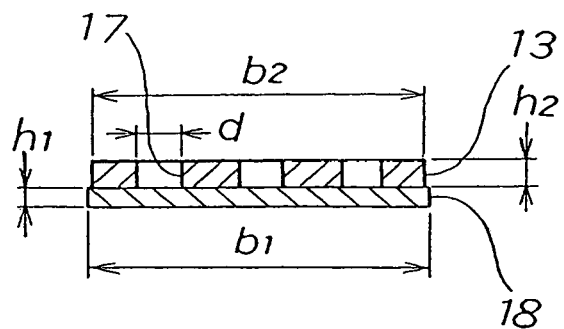
FIG. 6 is a cross sectional view taken along line 6—6 of FIG. 4.

In FIG. 6, with a given data: b1=the width of the blank sheet 18, h1=the height and Z1=the section modulus, the calculation is made using the formula $Z1=(b1)\cdot(h1)^2/6$.

The section modulus Z1 represents the magnitude of the bending rigidity, with an increase in the magnitude of the bending rigidity causing the blank material 18 to be hardly bent.

Similarly, with another given data: b2=the width of the backing plate 13, d=the diameter of the aperture 17, n=the number of the apertures, h2=the thickness and Z2=the section modulus, the calculation is made using the formula $Z2=(b2-n\cdot d)\cdot(h2)^2/6$.

The section modulus Z2 also represents the magnitude of the bending rigidity, with an increase in the magnitude of the bending rigidity causing the backing plate 18 to be hardly bent.

When using the backing plate 13 as a reinforcing material, the backing plate 13 has an increased thickness. That is, the relationship in thickness is selected to meet h1<h2. In a case where the backing plate 13 has a larger thickness than that of the blank sheet 18 and does not have the plural apertures 17, then the relationship is expressed by Z1<Z2, the presence of the backing plate 13 disturbs the bending formation of the blank sheet 18. In the case of h1<h2, consequently, it is desired to determine the value (n·d), namely, the diameter of the aperture 17 and the number of apertures 17, such that Z1=Z2 is satisfied. This process corresponds to the step of machining the apertures in the backing plate to meet the characteristic of the blank sheet (i.e., so as to adjust the section modulus (Z2) of the backing plate 13 relative to the section modulus (Z1) of the blank sheet 18).

Now, the case of h1≧h2 will be described. When the backing plate 13 has a lower bending rigidity than that of the blank sheet 18, the backing plate 13 is readily bent with a resultant increased expansion or contraction following the bending operation. With a further formation of the plural apertures 17 in such a backing plate 13, the backing plate 13 has a reduced rigidity and an increased expanding and contracting property. As a consequence, the blank sheet 18 has an improved bending fabrication property. Accordingly, even when the backing plate 13 has a lower thickness than that of the blank sheet 18, the formation of the plural apertures 17 in the backing plate 13 is useful.

FIGS. 7A to 7D are views for illustrating the sequence of variations in the shape of the aperture formed in the backing plate.

Figure 7A:
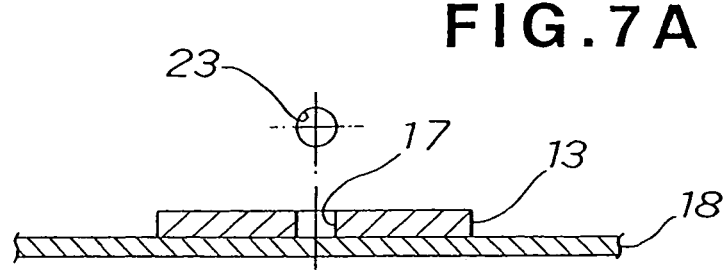
FIGS. 7A to 7D are schematic views illustrating the sequence of variation in shape of the aperture formed in the backing plate.

FIG. 7A shows a cross sectional view of the blank sheet 18 and the backing plate 13 wherein the aperture 17 looks like a true circle 23 as viewed from above.

Figure 7B:
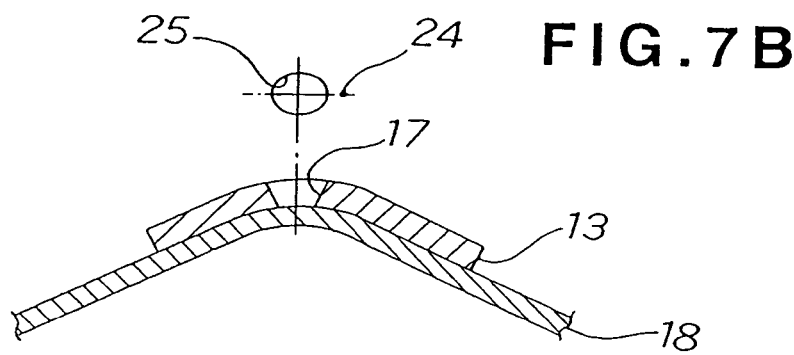

FIG. 7B shows a cross sectional view of the blank sheet 18 and the backing plate 13 which are bent so as to protrude upward. In this instance, the aperture 17 has an elliptical profile 25 extending along an axis 24 as viewed from above.

Figure 7C:
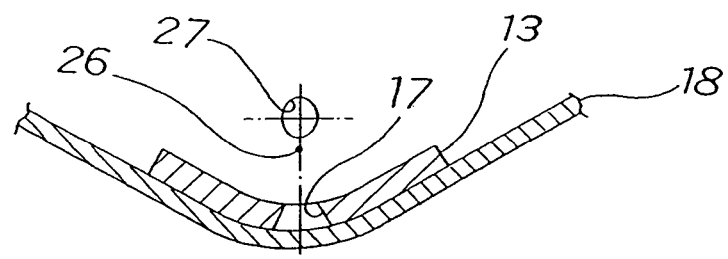

FIG. 7C shows a cross sectional view of the blank sheet 18 and the backing plate 13 with a profile which protrudes downward. In this instance, the aperture 17 looks like an elliptical profile 27 extending along an axis 26 as viewed from above.

Figure 7D:
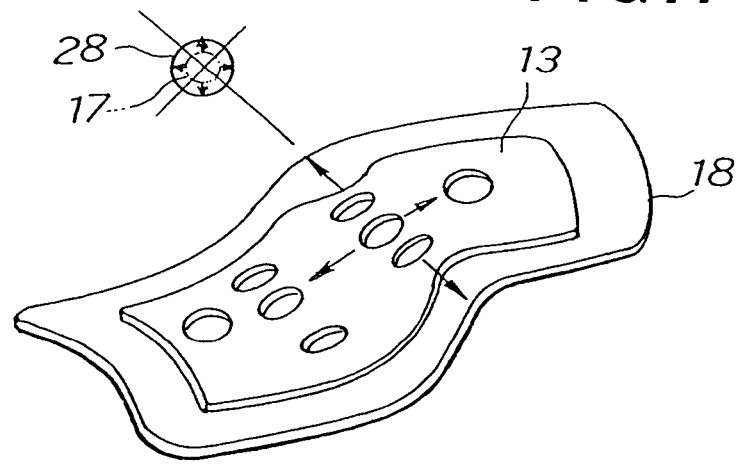

FIG. 7D shows a cross sectional view of the blank sheet 18 and the backing plate 13 which are formed by an expansion forming or a contraction forming. In this instance, the aperture 17 has a profile, which is radially expanded outward, namely, an aperture 28 which has an increase, radially expanded diameter.

In this manner, with such a deformation of the aperture 17, which is preliminarily the circle 23, into the elongated elliptical profile 25 which is expanded in a longitudinal (or lateral) direction, the elongated elliptical profile 27 which is expanded in a lateral (or longitudinal) direction, or the aperture 28 with the increased diameter, it is to be noted that the backing plate 13 becomes intimate with the blank sheet 18 during the bending operation, namely, that the backing plate 13 is synchronized with the blank sheet 18 in the bending operation.

With the backing plate 13 without such an aperture 17, namely, with an aperture-less backing plate, the backing plate is hard to follow the bending and expanding sequences of the blank sheet 18 and is inevitably brought into an undesirable ruptured state. With the backing plate 13 formed with such an aperture 17, these issues are successfully addressed.

Figure 8:
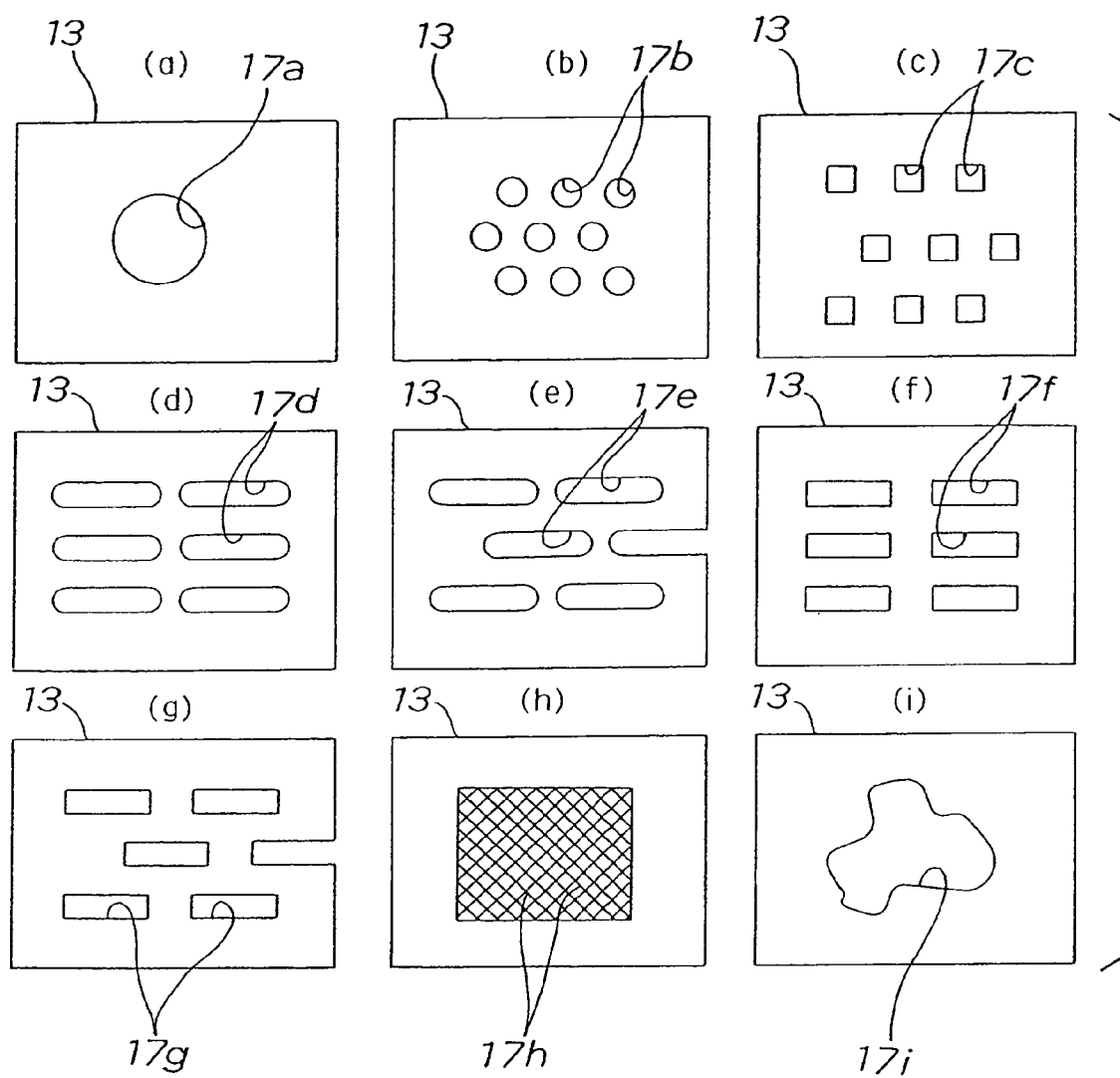
FIG. 8 is a schematic view illustrating various examples of the backing plates.

(a) to (i) of FIG. 8 show examples of various backing plates.

(a) shows a backing plate 13 having a single, large sized circle aperture 17a.
(b) shows a backing plate 13 having a plurality of small sized, circle apertures 17b formed in a zigzag pattern.
(c) shows a backing plate 13 having a plurality of small sized, rectangular apertures 17c formed in the zigzag pattern.
(d) shows a backing plate 13 having a plurality of oblong apertures 17d formed in a regular pattern.
(e) shows a backing plate 13 having a plurality of oblong apertures 17e formed in the zigzag pattern.
(f) shows a backing plate 13 having a plurality of elongated, rectangular apertures 17f formed in the regular pattern.
(g) shows a backing plate 13 having a plurality of elongated, rectangular apertures 17g formed in the zigzag pattern.
(h) shows a backing plate 13 having a plurality of apertures 17h formed in a lattice pattern.
(i) shows a backing plate 13 having a single aperture 17i formed in an arbitrarily irregular profile.

As noted above, it is thus possible to freely determine the profile of the aperture and the number of the apertures to be formed in the bending portion of the backing plate.

Figure 9:
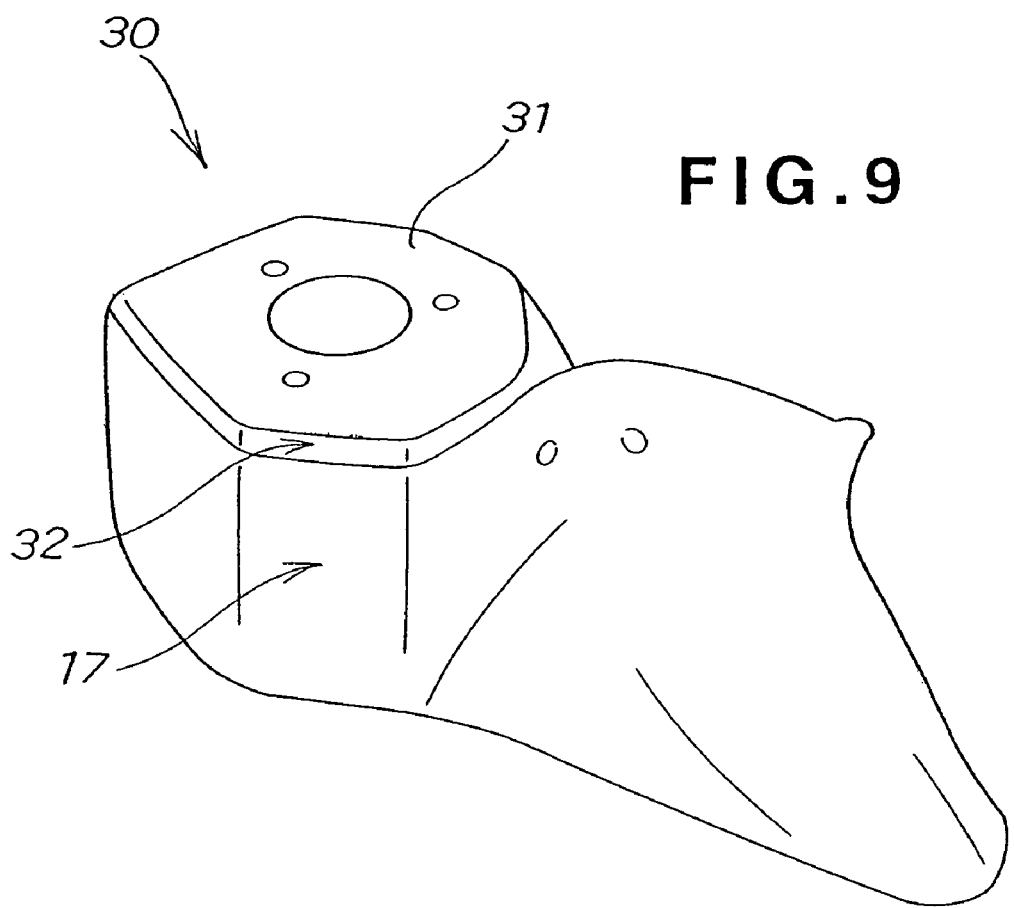
FIG. 9 is a perspective view of a damper housing.

FIG. 9 illustrates a damper housing in a perspective view. The damper housing 30 is a cylindrically shaped vehicular component part whose upper portion is formed with a damper seat 31. A strut damper, which forms a part of a wheel suspension unit, rests upon the damper seat 31. The damper housing 30 is constructed of a formed product including a plurality of steel plates piled to one another.

Figure 10:
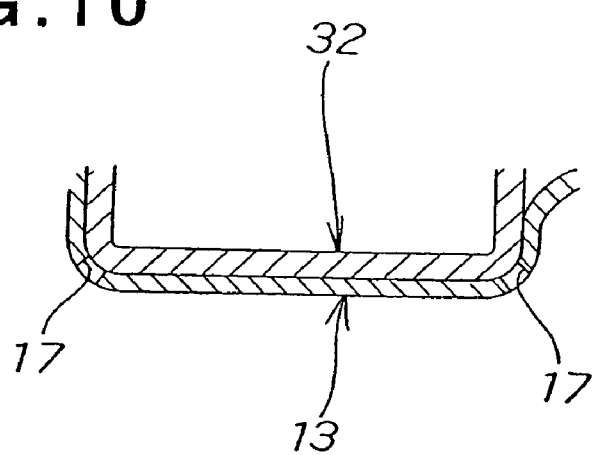
FIG. 10 is a partially enlarged, cross sectional view of the damper housing shown in FIG. 9.

FIG. 10 is a partial cross sectional view of the damper housing, wherein the backing plate 13 is piled to a cylindrical body 32 and the damper housing is subsequently finished by press forming the same in a single step, featuring that the backing plate 13 has a reduced thickness with the plural apertures 17, 17 formed at bending areas, namely, at corner sections to allow the backing plate 13 to become intimate with the cylindrical body 32 having a large thickness.

That is, during the press forming operation of the backing plate 13, which has the plural apertures 17, together with the cylindrical body 32, the presence of the plural apertures 17 formed in the backing plate 13 with a reduced thickness allows the backing plate 13 to be adequately expanded and bent in synchronism with the formation of the cylindrical body 32. As a result, the backing plate 13 is brought into an adequately tight contact with the cylindrical body 32 throughout an entire, overlapped area.

In the illustrated embodiment described above, although the vehicular body panel has been shown and described as applied to the example of the inner skin (stiffener) of the hood, the present invention may have any other application unless the vehicular body panel includes a panel, which forms a part of a vehicle body, such as a door, a floor and roof, etc.

In the illustrated embodiment, further, although the present invention has been shown and described as applied to the example of the vehicular component part composed of the damper housing, the present invention is not limited to the component part of that kind and may have application to component parts of the other kinds provided that each of the components parts includes a plurality of blank sheets (steel plates) which are piled to one another and constitute a product which is formed by the bending operation and which serves as an accessory component of a vehicle. That is, although the present invention is specifically suited for the bending operation and the product formed by bending, the present invention may also be widely used in the "forming process" involving forming of metal by contraction or expansion.

It will thus be seen that the present invention may be applied to the vehicular body panel in a broad sense or to the vehicular component parts in a broad sense.

Figure 11:
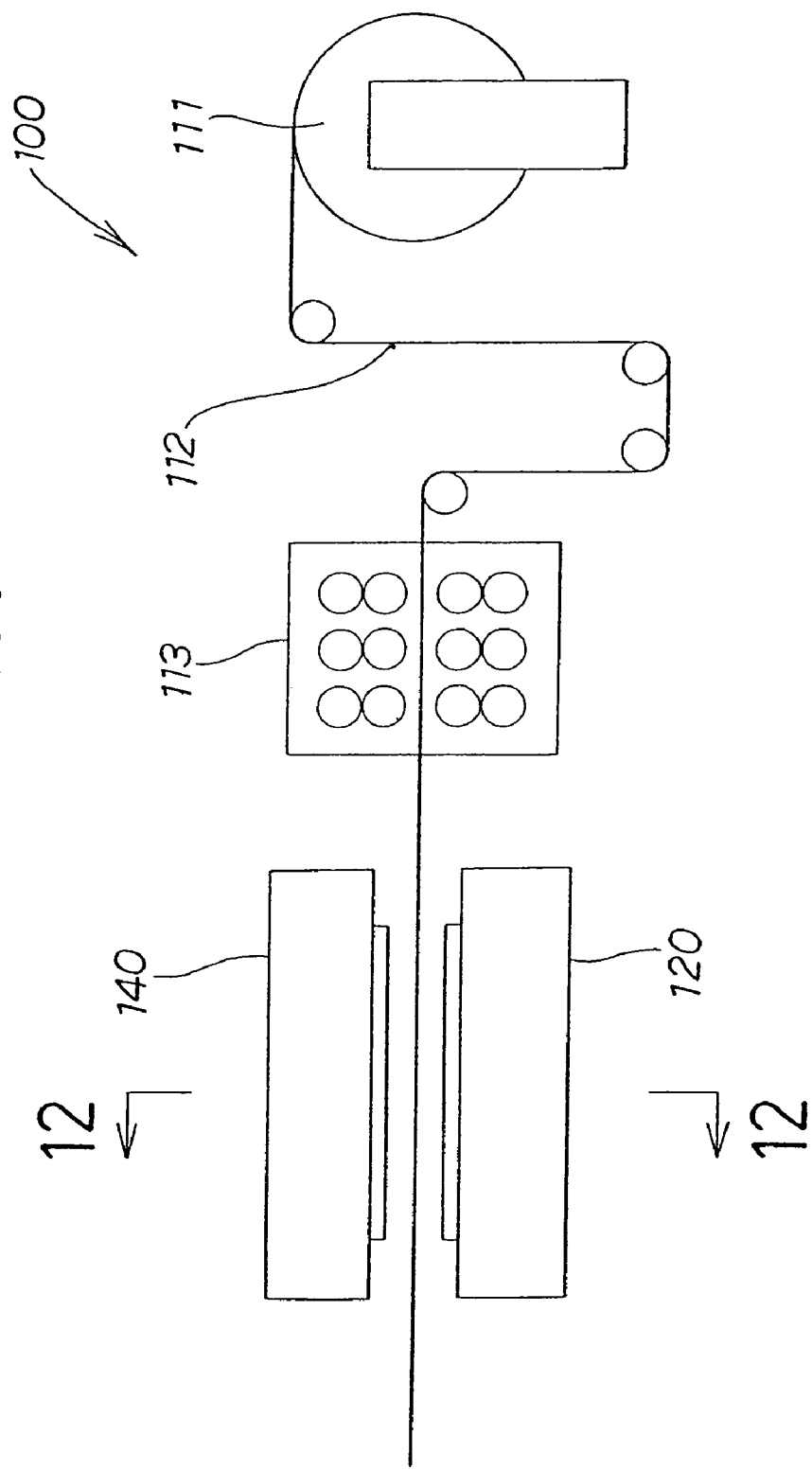
FIG. 11 is a schematic view of a layout of a manufacturing apparatus for the blank material of a vehicular body panel according to the present invention.

FIG. 11 shows a layout of a manufacturing apparatus, for the blank sheet of the vehicular body panel, according to the present invention. The manufacturing apparatus 100 for the blank sheet of the vehicular body panel is arranged to firstly rewind a strip-shaped sheet 112 from a coil 111 of metallic sheet, secondly passed through a leveler 113 for a flatness processing and finally passed through a blanking press machine, which includes main components such as upper and lower blanking die halves 140 and 120, for punching treatment to obtain the blank sheet.

Figure 12:
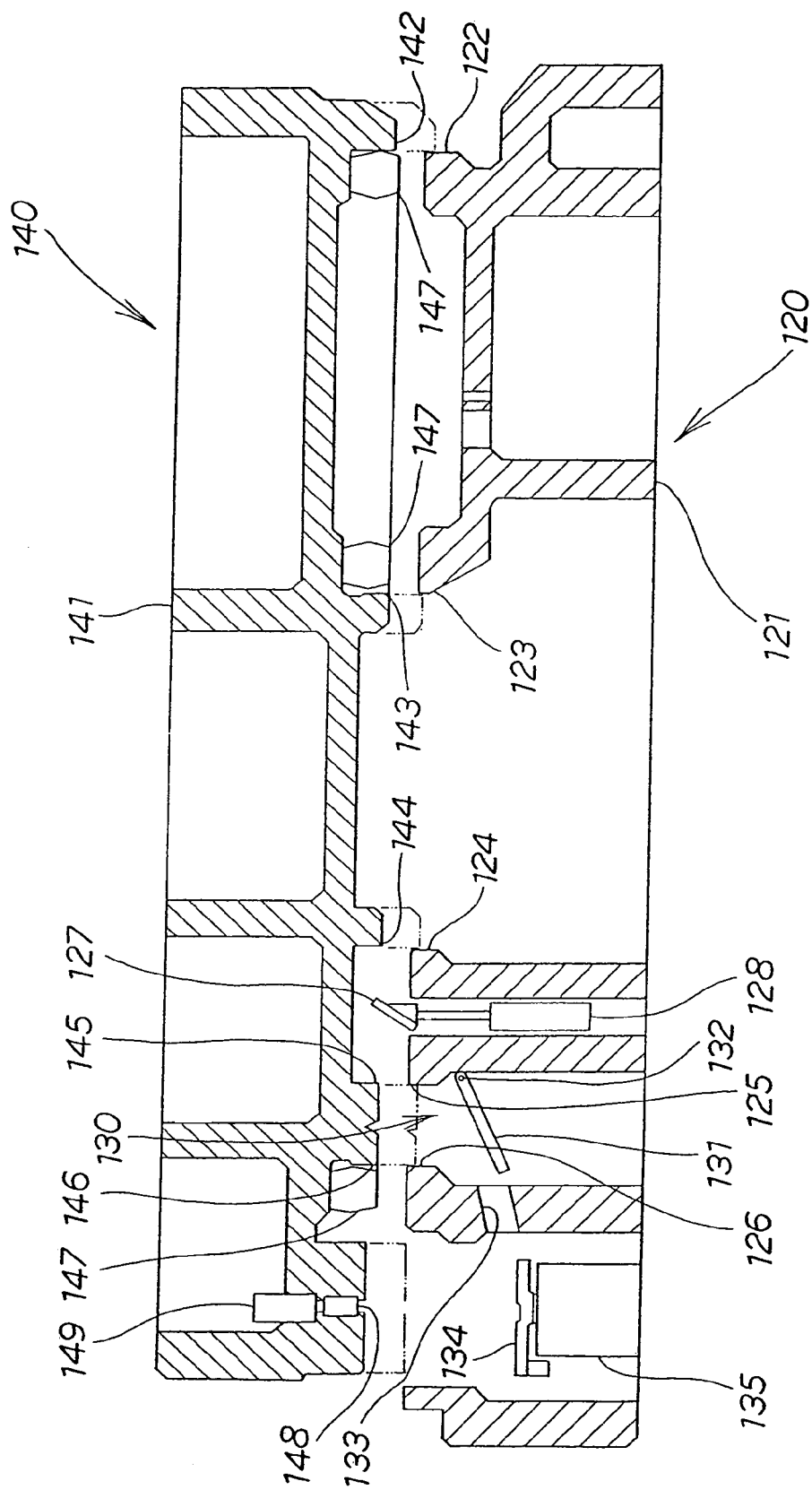
FIG. 12 is an enlarged cross sectional view taken along line 12—12 of FIG. 11.

In FIG. 12, a lower die body 121 of a lower blanking die half 120 includes a first die segment 122, a second die segment 123, a third die segment 124, a fourth die segment 125 and a fifth die segment 126. A backing plate transfer unit 130 is located between the third and forth die segments 124 and 125 and includes a thruster plate 127 and a thruster cylinder 128. A shutter plate 131, which forms part of the backing plate transfer unit 130, is located between the fourth and fifth die segments 125 and 126 for swinging movement about the center of a pin 132. The fifth die segment 126 has a through-hole 133 formed in the vicinity of the shutter plate 131. A backing plate supporting plate 134 is located in close proximity to a distal end of the through-hole 133 and is moved upward or downward by a vertically moveable cylinder 135. The aforementioned backing plate transfer unit 130 is thus constructed of the thruster plate 127, the thruster cylinder 128, the shutter plate 131 and the through-hole section 133 of the fifth die segment 126.

An upper die body 141 of an upper blanking die half 140 includes first to fifth cutter segments 142 to 146 for shearing the workpiece in mating engagement with the aforementioned first to fifth die segments 122 to 126, respectively. Stoppers 147, which are made of rubber, are located in the vicinity of the first, second and fifth cutter segments 142, 143 and 146, respectively. The upper blanking die half 140 also includes a punch 148 located in a position opposing to the backing plate supporting plate 134 for caulking operation, and a gun unit 149.

The first to fifth cutter segments 142 to 146 are arranged to move downward to a position indicated by a phantom line to perform the shearing of the workpiece. The upper blanking die half 140 may be held stationary and the lower blanking die half 120 may be lifted up to shear the workpiece.

Now, the operation of the aforementioned upper and lower blanking die halves is described with reference to FIGS. 13, 14A and 14B.

In FIG. 13, under a condition wherein the thruster plate 127 is retracted and the shutter plate 131 is tilted downward while the upper blanking die half 140 waits in an upper position, the strip-shaped sheet 112 is fed as the workpiece through between the upper and lower blanking die halves 140,120 from a front side to a rear side as viewed in FIG. 11. In addition, a first backing plate 151 is placed on the backing plate supporting plate 134 prior to the feeding of the strip-shaped sheet 112, subsequent to the feeding of the same or concurrently with the feeding of the same.

FIG. 14A shows the blank sheet as viewed from above.

In FIG. 14B, as the upper blanking die half 140 is lowered to a bottom dead center, the first cutter segment 142 is caused to slide in contact with the first die segment 122, thereby cutting out the sheet to form a first scrap 152.

A large sized second scrap 153 is cut out from the sheet with the second and fifth cutter segments 143,146, with the second scrap 153 being concurrently blanked out to form a second backing plate 154 with the third and fourth cutter segments 144,145. That is, as shown in FIG. 14A, the sheet is blanked out to form the second scrap 153 in a condition wherein the second backing plate 154 is left. Although the second backing plate 154 is identical in shape with the first backing plate 151, the terminologies "first" and "second" are conveniently used with a view to providing an ease of differentiating these from one another.

In FIG. 14B, further, when the upper blanking die half 140 is kept at the bottom dead center, the first backing plate 151 is brought into contact with the blank sheet 155, thereby enabling a caulking step in a manner as will be described in detail with reference to FIG. 15.

In FIG. 14A, reference numeral 156 designates caulked portions which allow the first backing plate 151 from being separated from the blank material 155. In FIG. 14B, the blank material 155, to which the first backing plate 151 is joined, is then discharged rearward with respect to the plane of the drawing when the upper blanking die half 140 is lifted upward.

An area, which is indicated by a symbol E1, is a punched out region and an area, which is indicated by a symbol E2, is a mounting place.

Now, a joining or reconciling method for reconciling the first backing plate 151 to the blank material 155 is described with reference to FIGS. 15A and 15B.

In FIG. 15A, a backing plate reconciling means is constructed of a caulking mechanism 160. The caulking mechanism 160 includes a gun 149 mounted to the upper blanking die half 140, a punch 148 attached to the gun 149, a vertically moveable cylinder 135 mounted to the lower blanking die half 120, and a backing plate supporting plate 134 connected to a distal end of a piston rod 161 of the cylinder 135. The distal end of the piston rod 161 is formed with an upwardly opening cavity segment 162.

In FIG. 15B, the actuation of the vertically moveable cylinder 135 causes the piston rod 161 to move upward, thereby rendering the first backing plate 151 to be brought into abutting contact with a bottom surface of the blank material 155. Then, the punch 148 is lowered with the gun 149 to protrude into the cavity segment 162. The intrusion of a part of the first backing plate 151 into the cavity segment 162 renders the first backing plate 151, which is held in abutting contact with the blank material 155, to be reconciled to the blank material 155.

Now, the operation of the backing plate transfer unit 130 is described with reference to FIG. 16. That is, when the discharging operation of the blank material has been completed and the upper blanking die half 140 remains in a waiting position, the succeeding operation is initiated.

As seen in FIG. 16, the backing plate supporting plate 134 is lowered and the shutter plate 131 is caused to swing in a clockwise direction as shown by arrow ① such that an edge of the shutter plate 131 fronts the through-hole 133. Then, the second backing plate 154, which is left on the lower blanking die half 120, is knocked up with the thruster plate 127. In this instance, the second backing plate 154 is dropped onto the shutter plate 131 and is transferred in sliding movement as shown by arrow ② and passes through the through-hole 133 onto the backing plate supporting plate 134. The second backing plate 154, which is located on the backing plate supporting plate 134, is fed to a subsequent blank material 155. That is, the backing plate transfer unit 130, which is composed of the thruster plate 127, the thruster cylinder 128, the shutter plate 131 and the through-hole segment 133, functions to transfer the second backing plate 154, which remains in the blanked out area E1, to the mounting area E2.

In this example, the second backing plate 154 is laterally transferred within a limited area between the upper and lower blanking die halves 140,120 without being discharged outside, enabling the second backing plate 154 to be reconciled to the blank sheet 155. In the event that the scrap is removed from the upper and lower blanking die halves 140,120 and is cut out again at another site to form another backing plate, although it is necessary to perform several steps involving the step of cutting out the backing plate, the step of transferring the cut out backing plate, the step of keeping possession of the backing plate, and the step of avoiding loss of the backing plate, there is no need for worrying about the loss of the second backing plate 154 in the illustrated embodiment of the present invention.

Figure 17:
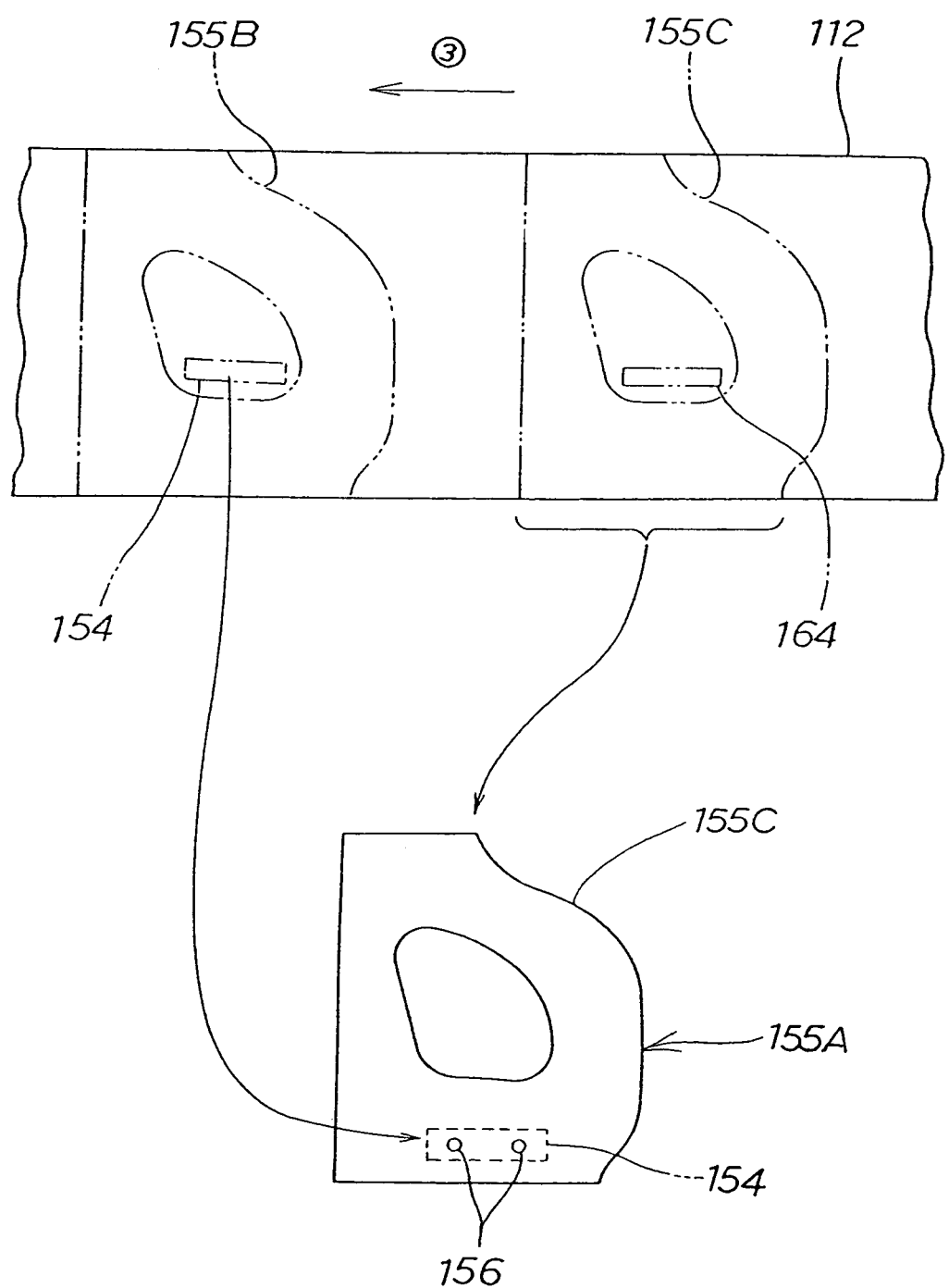
FIG. 17 is a view for illustrating a method of the present invention wherein the blank material is blanked from the strip-shaped plate, the backing is plate is cut out from a scrap and, subsequently, the backing plate is reconciled to the blank material.

As shown in FIG. 17, during movement of the strip-shaped plate 112 at a predefined constant speed in a direction as shown by arrow ③, first and second blank materials 155B, 155C are blanked out and second and third backing plates 154, 164 are blanked out from the scrap of the first blank material 155B and the scrap of the second blank material 155C, respectively. Subsequently, the second backing plate 154 is waited and reconciled to the second blank sheet 155C, thereby obtaining the blank material 155A with the backing plate joined thereto. Reference numeral 156 designates caulked portions.

It will now be appreciated from the foregoing description that the method of the present invention has the operating steps which are described below.

In FIG. 13, the strip-shaped sheet 112 for the vehicular body panel is fed through the upper and lower blanking die halves 140, 120 and, in addition thereto, the first backing plate 151 is prepared for reinforcing the vehicular body panel. This is referred to as a preparation step.

In FIG. 14B, further, the upper blanking die half 140 is mated with the lower blanking die half 120 relative to one another for thereby obtaining the blank sheet 155 for the vehicular body panel while obtaining the second backing plate 154, which has the same profile as the first backing plate 151, from the second scrap 153. This is referred to as a blanking step.

In FIG. 14B, consecutively, the aforementioned backing plate 151 is located on the blank sheet 155A and is reconciled thereto to provide a joined structure. This is referred to as a backing plate mounting step.

In addition, the upper blanking die half 140 is removed from the lower blanking die half 120, thereby expelling the blank sheet 155A with the backing plate joined thereto from the die halves. This is referred to as an expelling step.

It will thus be seen that it is possible to manufacture the blank sheet 155A with the backing plate at an improved efficiency by implementing the preparation step→the blanking step→the backing plate mounting step→the discharging step→the preparation step in a repeated sequence.

Figure 18:
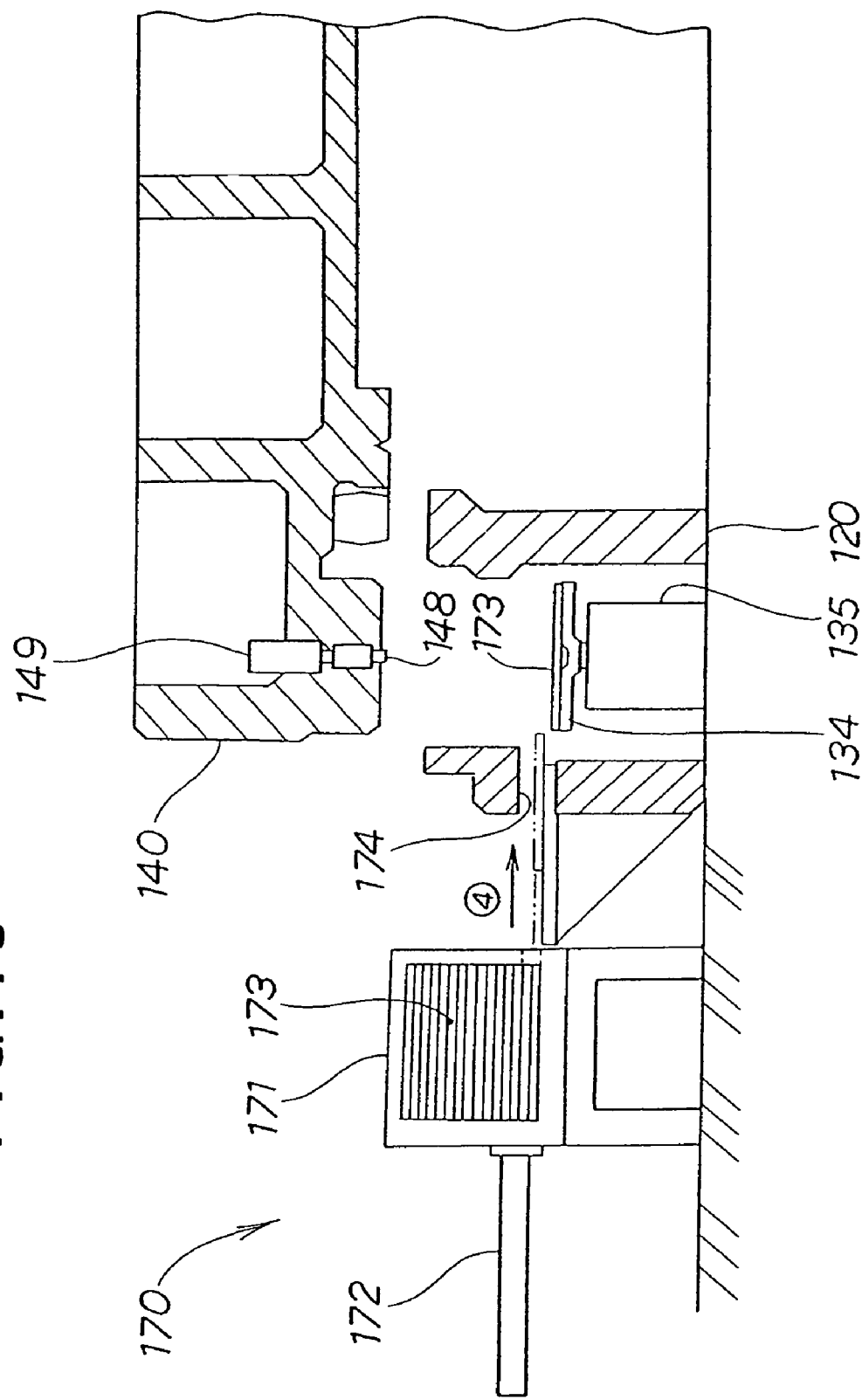
FIG. 18 is a cross sectional view illustrating another preferred embodiment which is different from that of FIG. 16.
Figure 19A:
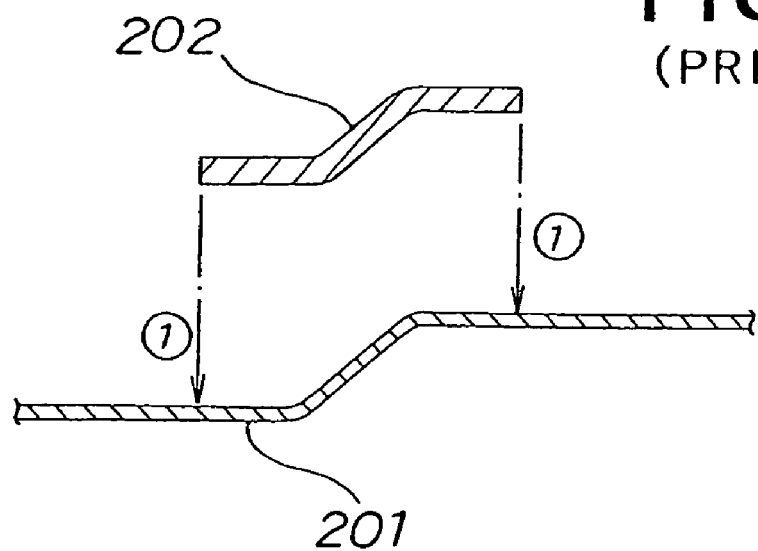
FIGS. 19A and 19B are views illustrating a summary of a conventional manufacturing process for the vehicular body panel.
Figure 19B:
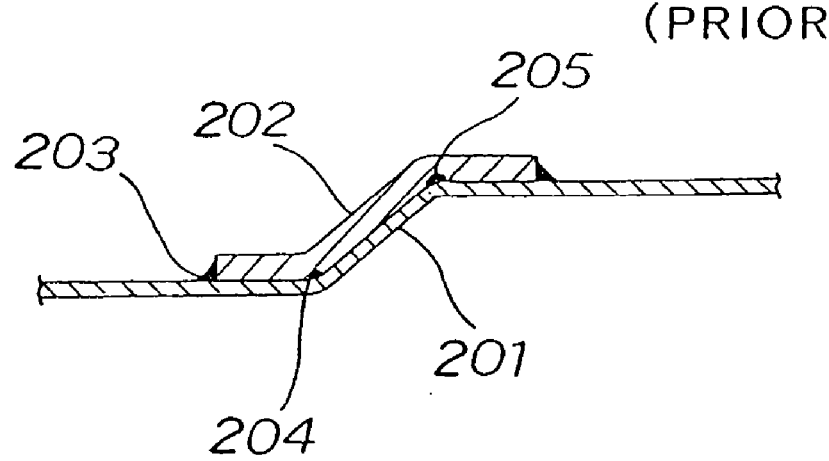

FIG. 18 shows another preferred embodiment of the present invention which is modified from the unit shown in FIG. 16. The lower blanking die half 120 includes a palletizer 171 and a pusher 172 both of which form a backing plate feeder mechanism 170. The backing plate 173, which remain at the lower most position among the piled plural backing plates 173, is sequentially pushed out as shown by arrow ④ and transferred through a through-hole 174 to be located on the backing plate supporting plate 134. The plural backing plates 173 may be cut out either from the scrap or from a strip-shaped steel sheet.

With such a backing plate feeder mechanism 170, it is possible to manufacture the blank sheet with the backing plate at an improved efficiency by implementing the preparation step→the blanking step→the backing plate mounting step→the charging step→the preparation step in a repeated sequence.

The backing plate reconciling means may involve the reconciling means such as the caulking means, the reconciling means with the adhesive, the melting means with welding or other similar reconciling means and it doesn't matter about the kind of the reconciling means.

Obviously, various minor changes and modifications of the present invention are possible in the light of the above teaching. It is therefore to be understood that within the scope of the appended claims, the invention may be practiced otherwise than as specifically described.

What is claimed is:

1. A vehicular part comprising:
   a blank material formed from a sheet metal and having a bent portion; and
   a backing plate joined with the blank material and having a bent portion corresponding in position to, and bent along a same bending line as, the bent portion of the blank material, the backing plate further having at least one aperture formed therein at the bent portion thereof and located on the bending line, wherein the aperture is designed so as to make a section modulus of the backing plate equal to a section modulus of the blank material.

2. The vehicular part according to claim 1, wherein the vehicular part is an inner skin forming part of a hood of a vehicle body, and the blank material forms the inner skin.

3. The vehicular part according to claim 2, wherein the inner skin has opposite side edge portions extending in a longitudinal direction of the vehicle body, and the backing plate is disposed on each of the side edge portions.

4. The vehicular part according to claim 1, wherein a size of the aperture is selected such that the section modulus of the backing plate equals a desired section modulus value.

5. The vehicle part according to claim 1, wherein plural apertures are formed in the backing plate, and each of said apertures are located on the bending line.

6. The vehicular part according to claim 5, wherein a size and number of the plurality of apertures is determined such that the section modulus of the backing plate equals a desired section modulus value.

7. The vehicular part according to claim 1, wherein plural apertures are formed in the backing plate, some of said apertures being located on the bending line while others of said plural apertures are spaced from the bending line.

8. The vehicular part according to claim 1, wherein said at least one aperture has a circular shape.

9. The vehicular part according to claim 1, wherein said at least one aperture has an oblong shape.

10. The vehicular part according to claim 1, wherein said at least one aperture has an elongated rectangular shape.

11. The vehicular part according to claim 1, wherein said at least one aperture comprises an irregularly profiled aperture.

12. The vehicular part according to claim 1, wherein plural apertures are formed in the backing plate, and said plural apertures are arranged in a zigzag pattern.

13. The vehicular part according to claim 1, wherein plural apertures are formed in the backing plate, and said plural apertures are arranged in parallel rows.

14. A vehicular part comprising:
   a blank material formed from a sheet metal and having a bent portion; and
   a backing plate joined with the blank material and having a bent portion corresponding in position to, and bent along a same bending line as, the bent portion of the blank material, the backing plate further having at least one aperture formed therein at the bent portion thereof and located on the bending line, wherein plural apertures are formed in the backing plate, and said plural apertures are arranged in a lattice pattern.

15. A vehicular part comprising:
   a blank material formed from a sheet metal and having a bent portion; and
   a backing plate joined with the blank material and having a bent portion corresponding in position to, and bent along a same bending line as, the bent portion of the blank material, the backing plate further having at least one aperture formed therein at the bent portion thereof and located on the bending line, wherein the backing plate bent portion and the blank material bent portion are in intimate contact with one another, wherein the aperture is designed so as to make a section modulus of the backing plate equal to a section modulus of the blank material.

16. The vehicular part according to claim 15, wherein the vehicular part is an inner skin forming part of a hood of a vehicle body, and the blank material forms the inner skin.

17. The vehicular part according to claim 16, wherein the inner skin has opposite side edge portions extending in a longitudinal direction of the vehicle body, and the backing plate is disposed on each of the side edge portions.

18. The vehicular part according to claim 15, wherein a size of the aperture is selected such that the section modulus of the backing plate equals a desired section modulus value.

19. The vehicular part according to claim 15, wherein plural apertures are formed in the backing plate, and each of said apertures are located on the bending line.

20. The vehicular part according to claim 19, wherein a size and number of the plurality of apertures is determined such that the section modulus of the backing plate equals a desired section modulus value.

21. The vehicular part according to claim 15, wherein plural apertures are formed in the backing plate, some of said apertures being located on the bending line while others of said plural apertures are spaced from the bending line.

22. The vehicular part according to claim 15, wherein said at least one aperture has a shape selected from the group consisting of circular, oblong, elongated rectangular, and irregularly profiled.

23. The vehicular part according to claim 21, wherein said plural apertures are arranged in a pattern selected from the group consisting of zigzag, lattice and parallel rows.

24. A vehicular part comprising:
a blank material formed from a sheet metal and having a bent portion, the bent portion being solid and free from aperture; and
a backing plate joined with the blank material and having a bent portion corresponding in position to, and bent along a same bending line as, the bent portion of the blank material, the backing plate further having at least one aperture formed therein at the bent portion thereof and located on the bending line, wherein the aperture is designed so as to make a section modulus of the backing plate equal to a section modulus of the blank material.

25. The vehicular part according to claim 24, wherein the vehicular part is an inner skin forming part of a hood of a vehicle body, and the blank material forms the inner skin.

26. The vehicular part according to claim 25, wherein the inner skin has opposite side edge portions extending in a longitudinal direction of the vehicle body, and the backing plate is disposed on each of the side edge portions.

27. The vehicular part according to claim 24, wherein a size of the aperture is selected such that the section modulus of the backing plate equals a desired section modulus value.

28. The vehicular part according to claim 24, wherein plural apertures are formed in the backing plate, and each of said apertures are located on the bending line.

29. The vehicular part according to claim 28, wherein a size and number of the plurality of apertures is determined such that the section modulus of the backing plate equals a desired section modulus value.

30. The vehicular part according to claim 24, wherein plural apertures are formed in the backing plate, some of said apertures being located on the bending line while others of said plural apertures are spaced from the bending line.

31. The vehicular part according to claim 24, wherein said at least one aperture has a shape selected from the group consisting of circular, oblong, elongated rectangular, and irregularly profiled.

32. The vehicular part according to claim 30, wherein said plural apertures are arranged in a pattern selected from the group consisting of zigzag, lattice and parallel rows.

* * * * *